US011321257B2

(12) United States Patent
Simionescu et al.

(10) Patent No.: US 11,321,257 B2
(45) Date of Patent: May 3, 2022

(54) QUALITY OF SERVICE CONTROL OF LOGICAL DEVICES FOR A MEMORY SUB-SYSTEM

(71) Applicant: Micron Technology, Inc., Boise, ID (US)

(72) Inventors: Horia C. Simionescu, Foster City, CA (US); Xiaodong Wang, Sunnyvale, CA (US); Venkata Yaswanth Raparti, Fremont, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/948,005

(22) Filed: Aug. 27, 2020

(65) Prior Publication Data

US 2021/0200703 A1 Jul. 1, 2021

Related U.S. Application Data

(60) Provisional application No. 62/956,034, filed on Dec. 31, 2019.

(51) Int. Cl.
*G06F 13/32* (2006.01)
*G06F 13/42* (2006.01)

(52) U.S. Cl.
CPC .......... *G06F 13/32* (2013.01); *G06F 13/4282* (2013.01); *G06F 2213/0026* (2013.01)

(58) Field of Classification Search
CPC .............................. G06F 13/32; G06F 13/4282
See application file for complete search history.

(56) References Cited

U.S. PATENT DOCUMENTS

| 6,487,562 | B1 * | 11/2002 | Mason, Jr. ............ G06F 3/0605 |
| 9,256,369 | B2 | 2/2016 | Nazm Bojnordi et al. |
| 9,582,218 | B2 * | 2/2017 | Nishtala ................ G06F 3/0626 |
| 10,241,835 | B2 * | 3/2019 | Wang .................... G06F 9/5011 |
| 10,564,857 | B2 * | 2/2020 | Benisty ................. G06F 3/0613 |

(Continued)

FOREIGN PATENT DOCUMENTS

KR 10-2014-0088834 A 7/2014

OTHER PUBLICATIONS

International Search Report and Written Opinion for International Application No. PCT/US2020/067690, dated Apr. 20, 2021, 10 pages.

*Primary Examiner* — Henry Tsai
*Assistant Examiner* — Christopher A Daley
(74) *Attorney, Agent, or Firm* — Lowenstein Sandler LLP (57) ABSTRACT

A processing device in a memory sub-system iteratively processes input/output (I/O) operations corresponding to a plurality of logical devices associated with a memory device. Tor each of the plurality of logical devices, the processing includes identifying a current logical device, determining one or more I/O operations in queue for the current logical device, and determining a number of operation credits associated with the current logical device. The number of credits is based at least in part on a set of quality of service (QoS) parameters for the current logical device. The processing further includes responsive to determining that the number of operation credits satisfies a threshold condition, performing the one or more I/O operations for the current logical device and identifying a subsequent logical device of the plurality of logical devices.

20 Claims, 7 Drawing Sheets

(56) References Cited

U.S. PATENT DOCUMENTS

| | | | |
|---|---|---|---|
| 2014/0181428 A1 | 6/2014 | Hsu et al. | |
| 2017/0075828 A1* | 3/2017 | Monji | G06F 13/42 |
| 2017/0199765 A1* | 7/2017 | Ahn | G06F 9/5005 |
| 2017/0222935 A1* | 8/2017 | Kalman | G06F 3/0659 |
| 2018/0081592 A1* | 3/2018 | Hegde | G06F 3/0611 |
| 2018/0088978 A1* | 3/2018 | Li | G06F 13/28 |
| 2018/0292997 A1 | 10/2018 | Leidel et al. | |
| 2018/0300263 A1* | 10/2018 | Wijayasekara | G06F 13/1689 |
| 2019/0205144 A1 | 7/2019 | Zhang et al. | |
| 2021/0132858 A1* | 5/2021 | Kamran | G06F 3/0659 |

\* cited by examiner

QUALITY OF SERVICE CONTROL OF LOGICAL DEVICES FOR A MEMORY SUB-SYSTEM

RELATED APPLICATIONS

This application claims the benefit of U.S. Provisional Patent Application No. 62/956,034, filed Dec. 31, 2019, the entire contents of which are hereby incorporated by reference herein.

TECHNICAL FIELD

The present disclosure generally relates to a memory sub-system, and more specifically, relates to quality of service control of logical devices for memory sub-systems.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various implementations of the disclosure.

DETAILED DESCRIPTION

Aspects of the present disclosure are directed to quality of service control of logical devices in memory sub-systems. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high performance memory devices that can be partitioned across multiple clients or users. Conventional memory sub-systems that are configured in this way can partition one or more memory devices into logical devices that can be assigned to different users or utilized for different application purposes. In such instances, the total capacity, as well as the access bandwidth and input/output operations per second (IOPS) capability, of a physical device can be apportioned to the logical devices (sometimes referred to as a virtualized "physical function"), either evenly across the logical devices or in different capacity profiles or configurations based on particular client or customer implementations. For example, a 1 Terabyte (Tb) physical device can be partitioned into multiple logical devices with equivalent capacities (e.g., 10 partitions of 100 Gigabytes (Gb), 1000 partitions of 1 Gb, etc.), or differing capacities (e.g., 5 partitions of 100 Gb and 20 partitions of 25 Gb). Furthermore, the available access bandwidth and/or TOPS capability can be partitioned among the multiple logical devices, in addition to or instead of the storage capacity. For example, certain percentages of the available bandwidth and/or TOPS capability can be assigned to each logical device.

Conventional memory sub-systems that are configured in this manner typically implement quality of service (QoS) policies to provide performance agreements to the users of each logical device or partition. In such cases, a QoS policy typically provides latency agreements to ensure that read and/or write operations satisfy predetermined threshold values. In many conventional implementations, however, the QoS policies are applied evenly across the partitions of a memory device. In other words, the latency capabilities of the physical device are distributed evenly across the logical devices/partitions. This can significantly limit implementation flexibility for the logical devices since it prevents configuring high performance partitions and lower performance partitions on the same physical drive. Additionally, many conventional memory sub-systems implement QoS policies in terms of latency rather than bandwidth measurements or TOPS metrics. Moreover, conventional implementations are configured such that the QoS policy of one logical device does not typically operate with any awareness of other logical devices for the same physical device. In such instances, overall bandwidth of a physical device can often be underutilized when one logical device is idle while other logical devices are experiencing heavier workloads.

Aspects of the present disclosure address the above and other deficiencies by implementing a QoS manager to facilitate quality of service control of logical devices in memory sub-systems. The QoS manager can receive bandwidth QoS parameters associated with logical device partitions for a physical device and divide the device bandwidth into sub-bands, where each sub-band is associated with one of the logical devices. The QoS manager can then determine the I/O operations in queue for a particular logical device and perform the queued operations using an earned credit scheme, where a logical device earns credits based on the QoS parameters. Additionally, the QoS manager can operate with awareness of all logical devices associated with a physical device such that any underutilized bandwidth of one logical device can be redirected to another logical device during periods of more active workloads.

Advantages of the present disclosure include, but are not limited to, significantly improved bandwidth performance for logical devices partitioned across a physical device in a memory sub-system. Implementing the QoS manager of the present disclosure can ensure QoS TOPS and bandwidth agreements for each logical device within its own performance sub-band using the credit scheme tuned to the QoS parameters. Additionally, since the QoS manager of the present disclosure is aware of the QoS parameters and current performance of each of the logical devices, any underutilized capabilities of the physical device can be redirected to any logical device that is operating under heavier workloads. Moreover, since the bandwidth performance of the memory device is improved, the performance of a memory sub-system that includes the memory device also improves, since fewer I/O bottlenecks are encountered across the memory sub-system.

Figure 1:
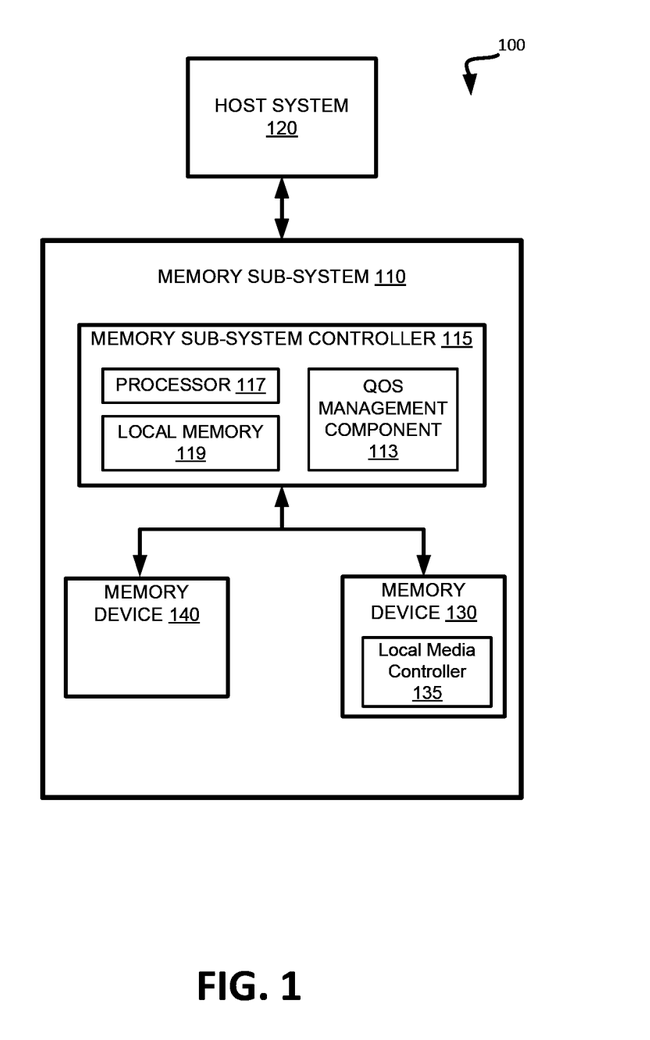
FIG. 1 illustrates an example computing system that includes a memory sub-system in accordance with some embodiments of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, a secure digital (SD) card, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), and penta-level cells (PLCs) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can be a processing device, which includes one or more processors (e.g., processor 117), configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical MU address, physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system controller 115 can additionally include QoS management component 113 that can be used to facilitate quality of service control of logical devices for memory sub-system 110. In some embodiments, memory sub-system controller 115 includes at least a portion of QoS management component 113. For example, the memory sub-system controller 115 can include a processor 117 (e.g., processing device) configured to execute instructions stored in local memory 119 for performing the operations described herein. In some embodiments, the QoS management component 113 is part of the host system 120, an application, or an operating system. In other embodiments, local media controller 135 includes at least a portion of QoS management component 113 and is configured to perform the functionality describe herein.

The QoS management component 113 can receive bandwidth and TOPS parameters associated with logical device partitions for a physical device (e.g., memory devices 130, 140 of memory sub-system 110). The QoS management component 113 can divide the bandwidth and/or TOPS capability for memory devices 130, 140 into sub-bands, where each sub-band is associated with one of the logical devices. The QoS manager can then determine the I/O operations in queue for a particular logical device and perform the queued operations using an earned credit scheme, where a logical device earns credits based on its associated QoS parameters. In various implementations, the QoS management component 113 can operate with awareness of other logical devices associated with memory devices 130, 140 such that any underutilized bandwidth or TOPS capability of one logical device can be redirected to another logical device during periods of more active workloads. Further details with regards to the operations of the QoS management component 113 are described below.

Figure 2:
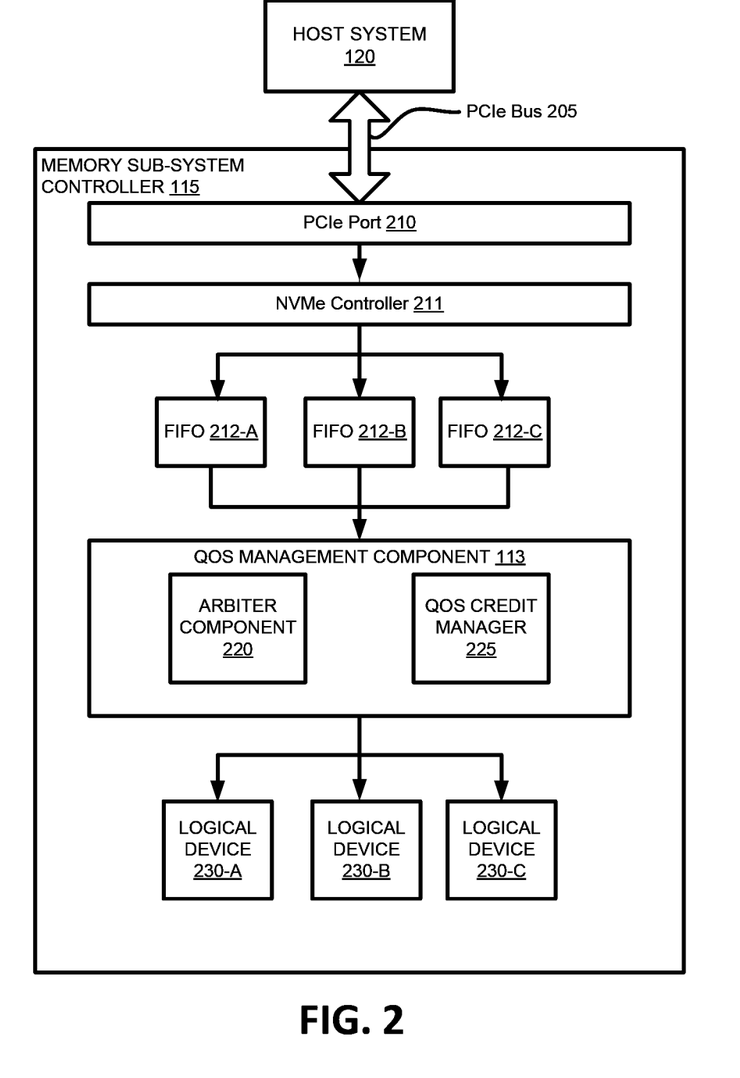
FIG. 2 illustrates an example interface between a host system and a memory sub-system controller implementing a quality of service (QoS) management component in accordance with some embodiments of the present disclosure.

FIG. 2 illustrates an example interface between a host system 120 and a memory sub-system controller 115 implementing a QoS management component 113 in accordance with some embodiments of the present disclosure. In various implementations, host system 120, memory sub-system controller 115, and QoS management component 113 correspond to host system 120, memory sub-system controller 115, and QoS management component 113 of FIG. 1.

In some implementations, memory sub-system controller 115 includes an NVMe controller 211 coupled to PCIe port 210 which enables communications with host system 120 across PCIe bus 205. As noted above, a memory sub-system can include memory devices that are partitioned into multiple logical devices 230 (e.g., logical devices 230-A, 230-B, 230-C). As noted above, in various implementations, the resources (e.g., storage capacity, I/O bandwidth capacity, etc.) of a physical memory device, such as memory device 130, can be partitioned into multiple logical devices 230, where each logical device 230 represents a portion of the resources of the physical device. Each logical device 230 can be presented to host system 120 as a representation of an independent physical device. In such instances, the total capacity of a physical device can be apportioned to the logical devices 230 (sometimes referred to as virtualized "physical functions"), either evenly across the logical devices 230 or in different capacity profiles or configurations based on particular client or customer implementations. For example, a 1 Terabyte (Tb) physical device can be partitioned into multiple logical devices with equivalent capacities (e.g., 10 partitions of 100 Gigabytes (Gb), 1000 with 1 Gb, etc.), or differing capacities (e.g., 5 partitions of 100 Gb and 20 partitions of 25 Gb.). Similarly, the bandwidth and/or IOPS capacity of a memory device can be divided across the logical partitions 230. In one embodiment, the bandwidth represents the total processing capacity of a memory device based on an amount of data in a given period of time, while the TOPS capacity represents a number of separate transactions that can be performed in a given period of time, and is potentially influenced by the size of those transactions For example, a memory device with an bandwidth capacity of 6 Gb/second can be partitioned such that logical device 230-A is configured with a maximum bandwidth of 2 Gb/sec, whereas logical device 230-B is configured with 1 Gb/sec. In other implementations, other configurations can be used for the logical devices 230.

In some implementations, NVMe controller 211 can be configured with one or more logical or virtual NVMe controllers that are each associated with one of the logical devices 230. Additionally, each logical device 230 can be associated with a corresponding first-in-first-out (FIFO) command queue (e.g., FIFO 212-A, 212-B, 212-C) that queues I/O commands for the logical devices 230. As I/O commands are received from the host 120 via PCIe port 210, the NVMe Controller 211 can determine the destination logical device 230 to which to direct the command and add the command to the corresponding FIFO queue for the destination logical device 230.

In various implementations, the I/O commands received from host 120 can be directed to one or more blocks of data stored by the logical devices 230. For example, a single I/O command (e.g., a command directed to a memory device configured as an NVMe device) can access a single block of data stored on logical device 230-A. In such instances, the NVMe controller 211 can determine that the command is to be directed to logical device 230-A and can store that command in the FIFO queue for logical device 230-A (e.g., FIFO 212-A). Once the command is processed by memory sub-system controller 115, the single NVMe I/O command can be translated into a format that is understood by the media controller of the memory device (e.g., a front end media controller (FEMC) command). In some implementations, a single NVMe I/O command can be a command to access data made up of multiple blocks. In such instances one NVMe I/O command can later be translated into multiple FEMC commands that are processed by the memory device. For example, a single NVMe I/O command directed to 4 blocks of data can cause 4 FEMC commands to be later executed by the memory device.

In various implementations, each of logical devices 230 can be configured with individual quality of service (QoS) parameters. As noted above, the QoS parameters for the logical devices can be based on the bandwidth or TOPS capabilities of the memory device that has been partitioned. For example, given a memory device capable of providing a maximum bandwidth of 12 Gb/sec, the individual logical devices 230 can be partitioned and configured with a fraction of that total capacity (e.g., 2 Gb/sec, 5 Gb/sec, etc.). In such instances, the total device bandwidth can be divided into sub-bands, where each logical device 230 is associated with one of the sub-bands. In some implementations, the entire bandwidth of a memory device does not need to be apportioned across all logical devices. In other words, once the logical devices have been apportioned some of the bandwidth of the memory device, if additional bandwidth remains unallocated, it can be held in reserve for use during periods of observed increases in I/O workload.

The logical devices 230 can be configured with QoS parameters associated with a particular mode of operation. Depending on the embodiment and mode, separate thresholds can be configured for different parameters (i.e., for bandwidth and TOPS). In one example, a logical device can be configured to not exceed a specified bandwidth or TOPS value (e.g., "limit mode"). The limit mode sets a maximum performance ceiling (e.g., a limit threshold) for a logical device that QoS management component 113 can enforce on each physical function. In some implementations, each assigned limit should be set below the device's max bandwidth (e.g., no logical device can have a performance ceiling above the capability of the drive). However, in some implementations, the sum of all limits for all logical devices can exceed the maximum capacity for the memory device (referred to as "oversubscribed"). In one embodiment, there can be separate limit thresholds corresponding to bandwidth and TOPS. In such an embodiment, the TOPS limit threshold should not exceed the bandwidth limit threshold and QoS management component 113 can enforce both thresholds.

In another example, a logical device can be configured to not fall below a specified bandwidth or TOPS value (e.g., "reservation mode"). The reservation mode sets a minimum performance floor (e.g., a reservation threshold) for a logical device that QoS management component 113 will guarantee for each physical function (assuming that the host workload intensity allows that threshold to be met). In some implementations, the sum of all reservations should not exceed the maximum capabilities for the memory device (referred to as "undersubscribed"). In one embodiment, there can be separate reservation thresholds corresponding to bandwidth and TOPS. In such an embodiment, the TOPS reservation threshold should not be higher than the bandwidth reservation threshold. Depending on the received workload, QoS management component 113 can guarantee at least one of these thresholds.

In another example, a logical device can be configured with a combination of a limit and reservation (e.g., "reservation with limit mode"). This mode defines a performance window within which the logical device should perform, defining both a floor and a ceiling bandwidth and IOPs value that QoS management component 113 can enforce on each physical function. As described above, the corresponding TOPS thresholds should not be higher than the corresponding bandwidth thresholds.

QoS management component 113 is responsible for management of the QoS parameters for each of the logical devices 230 for the memory subsystem. The QoS management component determines whether there are any queued commands in the FIFOs 212 and if so, performs one or more I/O operations for the logical devices while adhering to the QoS modes for the associated logical devices 230. The QoS management component 113 facilitates this process by implementing a credit scheme where credits are earned for each logical device in accordance with its assigned QoS performance mode as described above. A timer (e.g., a clock) is configured for each logical device such that the logical device earns credits based on the reservation threshold for the logical device and the timer cycle. Thus, a logical device can be configured to earn credits at a rate associated with the QoS parameters for the logical device (e.g., at a rate associated with the bandwidth frequency for the QoS mode) based on the cycles of the timer. In one embodiment, this timer can be referred to as a variable frequency credit-replenish clock.

QoS management component 113 can include a QoS credit manager 225 to manage the credits for each of the logical devices 230. In some implementations, a credit can be used to process a portion of the data associated with an I/O command. As noted above, a logical device associated with an NVMe memory device can be configured such that each I/O command can access data made up of one or more blocks. In such instances, the credit scheme can be configured such that the cost to access one block is one credit. Thus, one credit is needed for each block of the data associated with an I/O operation in order to complete the entire I/O operation. For example, if the I/O operation is associated with 10 blocks, then 10 credits can be used to complete the I/O operation. The QoS credit manager 225 can identify the QoS parameters for a logical device 230 and configure its associated timer so that the logical device can earn credits based on the associated reservation performance bandwidth or IOPs settings (based on the data size of the I/O command). The QoS credit manager 225 can additionally deduct credits spent by the received I/O operations that are directed to a particular logical device 230. In some implementations, the QoS credit manager 225 can be configured such that each logical device 230 is initiated with a beginning credit value that is greater than zero. Configuring the credit scheme in this manner can facilitate initial command processing more efficiently, since the logical devices should not need to wait for an extended period of time to accrue sufficient credits to perform I/O operations. An example of the management of credits for a logical device is illustrated below in conjunction with FIG. 3.

In various implementations, credits earned by one logical device 230 can be shared with another logical device 230. In other words, should logical device 230-A experience a period of heavy workload, resulting in the exhaustion of its credit balance (e.g., no available credits for I/O commands in queue), it could utilize stored credits accumulated by logical devices 230-B or 230-C if those logical devices do not have any I/O commands queued in their associated FIFOs 212. Similarly, if there is any unallocated bandwidth for a memory device, that too can be utilized by logical device 230-A. In this latter case, unallocated bandwidth can be assigned a logical device timer to maintain a credit store that can be shared with allocated logical devices during periods of high intensity workloads.

QoS management component 113 can additionally include an arbiter component 220 to monitor the FIFOs 212 for received I/O commands and to select a FIFO from which to retrieve the next I/O command to be processed. In various implementations, the arbiter component 220 can select the FIFOs 212 in a round robin scheduling fashion and utilize the credit information managed by QoS credit manager 225 to determine whether to process a command from the selected FIFO 212. In one example, arbiter component 220 can select FIFO 212-A, and determine whether FIFO 212-A has a command that can be fetched. If so, arbiter component 220 can then access the credit information maintained by QoS credit manager 225 to determine whether logical device 230-A has at least one credit available. If so, then arbiter component 220 can fetch the command and forward it to logical device 230-A. If the command is directed to multiple blocks, arbiter component 220 can determine how many credits are needed to process all of the blocks associated with the command. If the number of credits needed to process the I/O command exceeds the number of credits available for the logical device, all of the blocks associated with command can be processed, but the total credits available can be driven to a negative number. The negative credit value can still be refreshed according to the timer clock.

If the arbiter component 220 determines that logical device 230-A does not have any available credits to process the I/O command, several alternatives can be performed. In one example, arbiter component 220 can skip the command and move to the next available FIFO 212 (e.g., FIFO 212-B) to repeat the process for that FIFO 212. Alternatively, arbiter component 220 can determine whether any of the other logical devices 230 have credits available but do not have any commands queued in their associated FIFO 212 to be processed. In such instances, arbiter component 220 can utilize the processing slot for the idle logical device to process the command for logical device 230-A. For example, arbiter component 220 can determine that logical device 230-B has credits available but no commands queued in FIFO 212-B, so the command queued in FIFO 212-A for logical device 230-A can still be processed even though logical device 230-A has insufficient credits accumulated to execute the command.

In various implementations, arbiter component 220 can be configured to perform arbitration on a number of different types of requests issued by or directed to the physical functions (e.g., logic devices 230-A, 230-B, 230-C). In one example, arbiter component 220 can perform arbitration based on a timer (e.g., "timer arbitration"). In such instances, arbiter component 220 can select the FIFO 212 for the logical device 230 based on the credit timer frequency associated with the logical device and issue what is referred to as a "timer request." Thus, a timer request can be generated in synchronization with each cycle of the above mentioned credit-replenish clock. In other words, a logical device 230 needs to have at least one credit for its associated FIFO to be selected. Otherwise, the FIFO for that logical device 230 is bypassed and the next FIFO is selected. When a timer request is serviced by arbiter component 220, the number of timer requests is decremented by the number of blocks fetched, and could become negative. Timer credits are replenished on each cycle of the credit-replenish clock.

In another example, arbiter component 220 can perform arbitration based on an available opportunity to execute a command (e.g., "opportunistic arbitration"). In such instances, if the selected FIFO 212 does not include a command, arbiter component 220 can select a different FIFO, such as FIFO 212-A, that does have commands queued for processing whether the associated logical devices have sufficient credit or not. Such an action can be referred to as an "opportunistic request" and is generated when a physical function has at least one IOPS extra credit and one bandwidth extra credit available. Arbiter component 220, however, will only service an opportunistic request when the timer request for another physical function is left unconsumed, because there was no I/O operation for that physical function at that time.

In another example, arbiter component 220 can perform arbitration based on a burst of requests (e.g., "burst arbitration"). In such instances, if a command is fetched based on a timer (e.g., timer arbitration) an additional command can be fetched immediately and processed. Such an action can be referred to as a "burst request" and is generated asynchronously between timer events when at least one burst credit (or timer credit) is available. Similar to a timer request, when a burst request is serviced by arbiter component 220, the number of burst credits is decremented by the number of blocks fetched, and could become negative. In one embodiment, burst requests of all physical functions are serviced in a round-robin fashion. Burst arbitration allows each physical function to process short I/O bursts quicker and can be beneficial depending on the host workload. In a sustained type of workload, the burst requests are immediately consumed, and then for each burst credit returned, only timer requests are processed.

As described above, opportunistic requests take advantage of timer requests left unconsumed by other physical functions. When the sum of all reservations is strictly undersubscribed, the device bandwidth left unassigned can be used by QoS management component 113 to generate timer events that can be shared by the all physical functions for opportunistic requests. These opportunistic requests can be issued by physical functions that have been configured in reservation mode or reservation with limit mode and were provisioned with extra credit allowances to permit them to reach the corresponding limits. To allow reaching the TOPS limit, for example, the TOPS extra credit allowance can be calculated as the differential between the IOPS limit and the TOPS reservation. Similarly, the bandwidth extra credit allowance is calculated as the additional number of blocks that need to be transferred, above the bandwidth reservation, such that bandwidth limit could be reached.

In one embodiment, the bandwidth and TOPS extra credit allowances are calculated to be used during a period of time which can be referred to as a "session." One session follows another, and at the beginning of each session the extra credit allowances are replenished. During a session, the physical function makes opportunistic requests as long as it has at least one available credit in each type of the extra credit allowances. When an opportunistic request is serviced, the IOPS extra credit allowance is decremented by one and the bandwidth extra credit allowance is decremented by the number of blocks requested.

Figure 3:
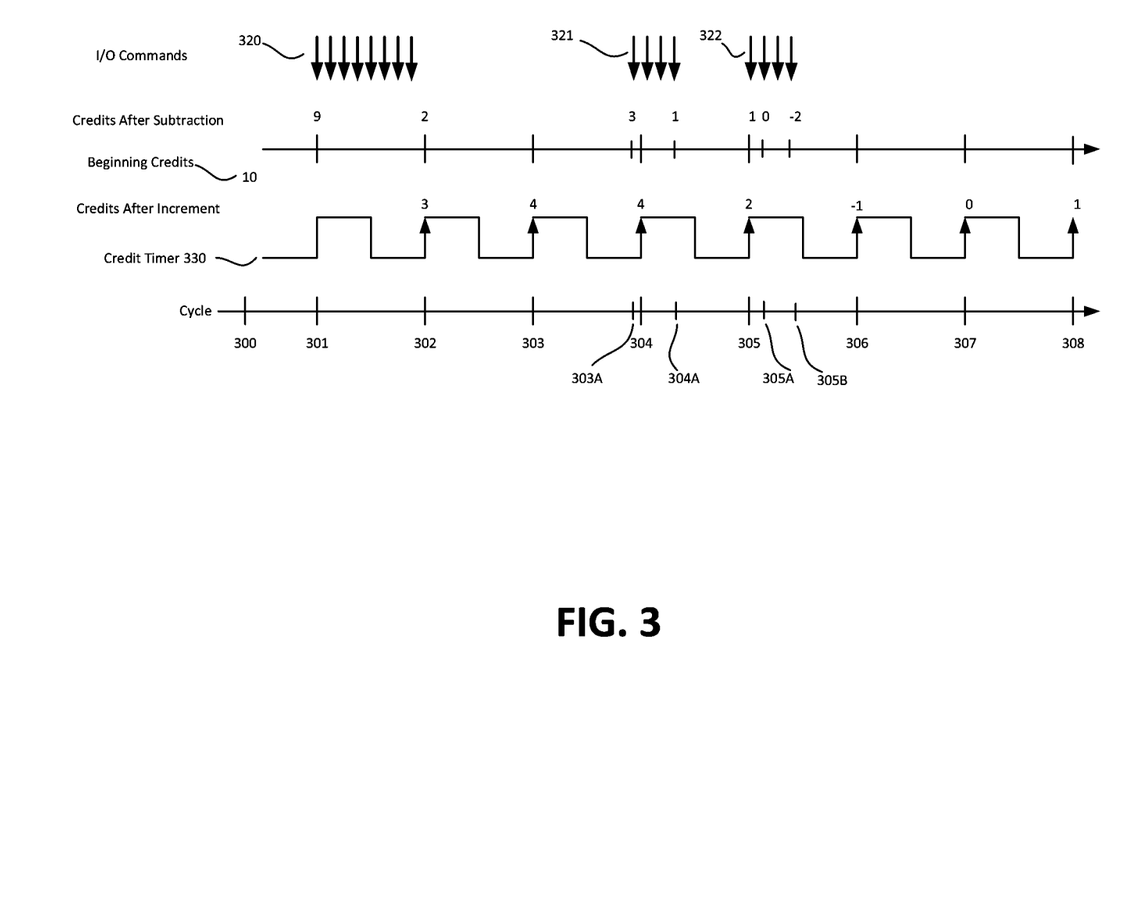
FIG. 3 illustrates an example of credit management for a logical device in accordance with some embodiments of the present disclosure.

FIG. 3 illustrates an example of credit management for a logical device in accordance with some embodiments of the present disclosure. In some embodiments, this process can be performed by the QoS management component 113 of FIG. 1 and as described above with respect to FIG. 2.

As shown in FIG. 3, the logical device has been configured such that its number of credits has been initialized to 10 at startup (e.g., timer cycle 300). The logical device is associated with a credit timer 330 where credits are earned for the logical device in accordance with the QoS parameters associated with the logical device. Thus, as shown, an additional credit is earned for the logical device that can be applied to processing I/O requests held in a corresponding FIFO queue, after each successive timer cycle. FIG. 3 illustrates a series of I/O commands fetched from the associated FIFO, the credit costs associated with processing the commands, and the credit accumulations caused by the credit timer cycles of credit timer 330.

At timer cycle 301, the arbiter component of the QoS management component (e.g., arbiter component 220 in FIG. 2) selects the FIFO for the logical device and identifies I/O command 320 in the corresponding FIFO queue. In one embodiment, I/O command 320 includes 8 sub-commands directed to different blocks. Alternatively, I/O command 320 can represent a single sub-command that is to access 8 different blocks. In both cases, since I/O command 320 accesses 8 blocks, a total of 8 credits will be needed to satisfy the command. The first sub-command of I/O command 320 is processed at timer cycle 301, decrementing the total credits from 10 to 9. As shown, the 8 sub-commands for the 8 blocks of I/O command 320 are processed between clock cycle 301 and 302, thus decrementing the credit count from 10 to 2 (illustrated by the "credits after subtraction" value of 2).

At cycle 302, the credit timer 330 has accumulated an additional credit that changes the credit count from 2 to 3 (illustrated by the "credits after increment" value of 3). At cycle 303, the credit timer 330 has accumulated an additional credit that changes the credit count from 3 to 4 (illustrated by the "credits after increment" value of 4). In some implementations, since no additional commands are in queue between timer cycles 302 and 303A, the arbiter component can select another FIFO queue to determine whether any commands are available for processing in another FIFO queue.

At cycle 303A, a second set of I/O commands 321 is fetched by the arbiter component 220. For example, arbiter component 220 can fetch the second set of I/O commands 321 based on a burst arbitration scheme. As shown, the first sub-command decrements the credit count from 4 to 3 (illustrated by the "credits after subtraction" value of 3). At cycle 304, an additional credit is accumulated that changes the credit count from 3 to 4 (illustrated by the "credits after increment" value of 4), and that credit is immediately used by the second sub-command of I/O command 321, which changes the credit count back to 3. The two additional sub-commands are subsequently processed which further reduces the credit count to 1 at cycle 304A (illustrated by the "credits after subtraction" value of 1).

At cycle 305, the credit timer 330 has accumulated an additional credit that changes the credit count from 1 to 2 (illustrated by the "credits after increment" value of 2). During the same cycle, a third set of I/O commands 322 is fetched by the arbiter component. The first sub-command is processed, which decrements the credit count from 2 to 1 (illustrated by the "credits after subtraction" value of 1). The second sub-command is then processed, which further decrements the credit count from 1 to 0 at cycle 305A (illustrated by the "credits after subtraction" value of 0).

At cycle 305A, although the logical device has exhausted its earned credits, the remaining two sub-commands of I/O command 322 can still be processed. Thus, by cycle 305B, the credit count is decremented from 0 to −2. As shown in FIG. 3, one additional credit is accumulated at cycle 306, and another additional credit is accumulated at cycle 307, bringing the total credit count back to 0. Another credit is accumulated at cycle 308, bringing the total credit count from 0 to 1 (illustrated by the "credits after increment" value of 1). As long as the logical device has one or more earned credits, arbiter component 220 can fetch a new I/O command associated with the logical device to be processed. By implementing the credit timer in accordance with the QoS parameters for the logical device, the ceiling threshold for the logical device can be preserved.

Figure 4:
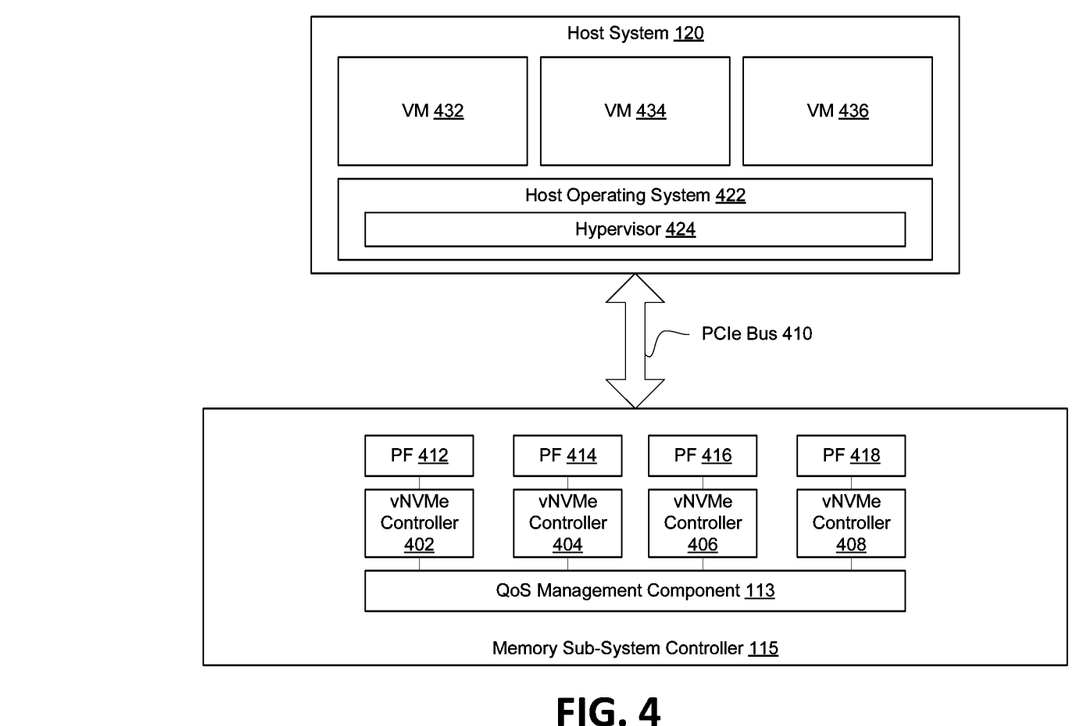
FIG. 4 illustrates an example physical host interface between a host system and a memory sub-system implementing quality of service management in accordance with some embodiments of the present disclosure.

FIG. 4 illustrates an example physical host interface between a host system and a memory sub-system implementing quality of service management in accordance with some embodiments of the present disclosure. In one embodiment, memory sub-system controller 115 of memory sub-system 110 is connected to host system 120 over a physical host interface, such as PCIe bus 410. In one embodiment, memory sub-system controller 115 manages one or more NVMe controllers 402-408. Depending on the embodiment, there can be a single NVMe controller, as illustrated above with respect to FIG. 2, or multiple virtual NVMe controllers 402-408, which are virtual entities that appear as physical controllers to other devices, such as host system 120, connected to PCIe bus 410 by virtue of a physical function 412-418 associated with each virtual NVMe controller 402-408. FIG. 4 illustrates four virtual NVMe controllers 402-408 and four corresponding physical functions 412-418. In other embodiments, however, there can be any other number of NVMe controllers, each having a corresponding physical function. All of the virtual NVMe controllers 402-408 have the same priority and same functionality.

Each of virtual NVMe controllers 402-408 manages storage access operations for the underlying memory device 130. For example, virtual NVMe controller 402 can receive data access requests from host system 120 over PCIe bus 410, including requests to read, write, or erase data. In response to the request, virtual NVMe controller 402 can identify a physical memory address in memory device 130 pertaining to a logical memory address in the request, perform the requested memory access operation on the data stored at the physical address and return requested data and/or a confirmation or error message to the host system 120, as appropriate. Virtual NVMe controllers 404-408 can function in the same or similar fashion with respect to data access requests for memory device 130.

As described above, each of physical functions 412-418 is associated with each of virtual NVMe controllers 402-408 in order to allow each virtual NVMe controller 402-408 to appear as a physical controller on PCIe bus 410. For example, physical function 412 can correspond to virtual NVMe controller 402, physical function 414 can correspond to virtual NVMe controller 404, physical function 416 can correspond to virtual NVMe controller 406, and physical function 418 can correspond to virtual NVMe controller 408. Physical functions 412-418 are fully featured PCIe functions that can be discovered, managed, and manipulated like any other PCIe device, and thus can be used to configure and control a PCIe device (e.g., virtual NVMe controllers 402-408). Each physical function 412-418 can have some number virtual functions associated with therewith. The virtual functions are lightweight PCIe functions that share one or more resources with the physical function and with virtual functions that are associated with that physical function. Each virtual function has a PCI memory space, which is used to map its register set. The virtual function device drivers operate on the register set to enable its functionality and the virtual function appears as an actual PCIe device, accessible by host system 120 over PCIe bus 410.

Each physical function 412-418 can be assigned to any one of virtual machines 432-436 in the host system 120. When I/O data is received at a virtual NVMe controller 402-408 from a virtual machine 432-436, a virtual machine driver provides a guest physical address for a corresponding read/write command. The physical function number can be translated to a bus, device, and function (BDF) number and then added to a direct memory access (DMA) operation to perform the DMA operation on the guest physical address. In one embodiment, controller 115 further transforms the guest physical address to a system physical address for the memory sub-system 110.

Furthermore, each physical function 412-418 can be implemented in either a privileged mode or normal mode. When implemented in the privileged mode, the physical function has a single point of management that can control resource manipulation and storage provisioning for other functions implemented in the normal mode. In addition, a physical function in the privileged mode can perform management options, including for example, enabling/disabling of multiple physical functions, storage and quality of service (QoS) provisioning, firmware and controller updates, vendor unique statistics and events, diagnostics, secure erase/encryption, among others. Typically, a first physical function can implement a privileged mode and the remainder of the physical functions can implement a normal mode. In other embodiments, however, any of the physical functions can be configured to operate in the privileged mode. Accordingly, there can be one or more functions that run in the privileged mode.

Host system 120 runs multiple virtual machines 432, 434, 436, by executing a software layer 424, often referred to as "hypervisor," above the hardware and below the virtual machines, as schematically shown in FIG. 4. In one illustrative example, the hypervisor 424 can be a component of a host operating system 422 executed by the host system 120. Alternatively, the hypervisor 424 can be provided by an application running under the host operating system 422, or can run directly on the host system 120 without an operating system beneath it. The hypervisor 424 can abstract the physical layer, including processors, memory, and I/O devices, and present this abstraction to virtual machines 432, 434, 436 as virtual devices, including virtual processors, virtual memory, and virtual I/O devices. Virtual machines 432, 434, 436 can each execute a guest operating system which can utilize the underlying virtual devices, which can, for example, map to the memory device 130 managed by one of virtual NVMe controllers 402-408 in memory sub-system 110. One or more applications can be running on each virtual machine under the guest operating system.

Each virtual machine 432, 434, 436 can include one or more virtual processors. Processor virtualization can be implemented by the hypervisor 424 scheduling time slots on one or more physical processors such that from the guest operating system's perspective, those time slots are scheduled on a virtual processor. Memory virtualization can be implemented by a page table (PT) which is a memory structure translating guest memory addresses to physical memory addresses. The hypervisor 424 can run at a higher privilege level than the guest operating systems, and the latter can run at a higher privilege level than the guest applications.

In one implementation, there can be multiple partitions on host system 120 representing virtual machines 432, 434, 436. A parent partition corresponding to virtual machine 432 is the root partition (i.e., root ring 0) that has additional privileges to control the life cycle of other child partitions (i.e., conventional ring 0), corresponding, for example, to virtual machines 434 and 436. Each partition has corresponding virtual memory, and instead of presenting a virtual device, the child partitions see a physical device being assigned to them. When host system 120 initially boots up, the parent partition can see all of the physical devices directly. The pass through mechanism (e.g., PCIe Pass-Through or Direct Device Assignment) allows the parent partition to assign an NVMe device (e.g., one of virtual NVMe controllers 402-408) to the child partitions. The associated virtual NVMe controllers 402-408 can appear as a virtual storage resource to each of virtual machines 432, 434, 436, which the guest operating system or guest applications running therein can access. In one embodiment, for example, virtual machine 432 is associated with virtual NVMe controller 402, virtual machine 434 is associated with virtual NVMe controller 404, and virtual machine 436 is associated with virtual NVMe controller 406. In other embodiments, one virtual machine can be associated with two or more virtual NVMe controllers. The virtual machines 432, 434, 436, can identify the associated virtual NVMe controllers using a corresponding bus, device, and function (BDF) number, as will be described in more detail below.

QoS management component 113 can implement access control services for each of virtual NVMe controllers 402-408. The access control services manage what devices have access permissions for the virtual NVMe controllers 402-408. The access permissions can define, for example, which of virtual machines 432-436 on host system 120 can access each of virtual NVMe controllers 402-408, as well as what operations each of virtual machines 432-436 can perform on each of virtual NVMe controllers 402-408. In one embodiment, QoS management component 113 controls access permissions for each of virtual NVMe controllers 402-408 individually. For example, in the privileged mode, QoS management component 113 can grant virtual machine 432 permission to read and write data using virtual NVMe controller 402, but only permission to read data using virtual NVMe controller 404. Similarly, in the privileged mode, QoS management component 113 can grant virtual machine 432 permission to read and write data using virtual NVMe controller 404 only. Any combination of access permissions can be defined for virtual NVMe controllers 402-408. When a memory access request is received for one of virtual NVMe controllers 402-408, QoS management component 113 can analyze the conditions of the request (e.g., requester, target, operation, requested data address, etc.) based on access policies defining the access control services. The access policies can be stored in local memory 119. If the request satisfies the corresponding access policy (the conditions of the request match conditions specified in the corresponding access policy), QoS management component 113 can grant the access request. Otherwise, the request can be denied.

Figure 5:
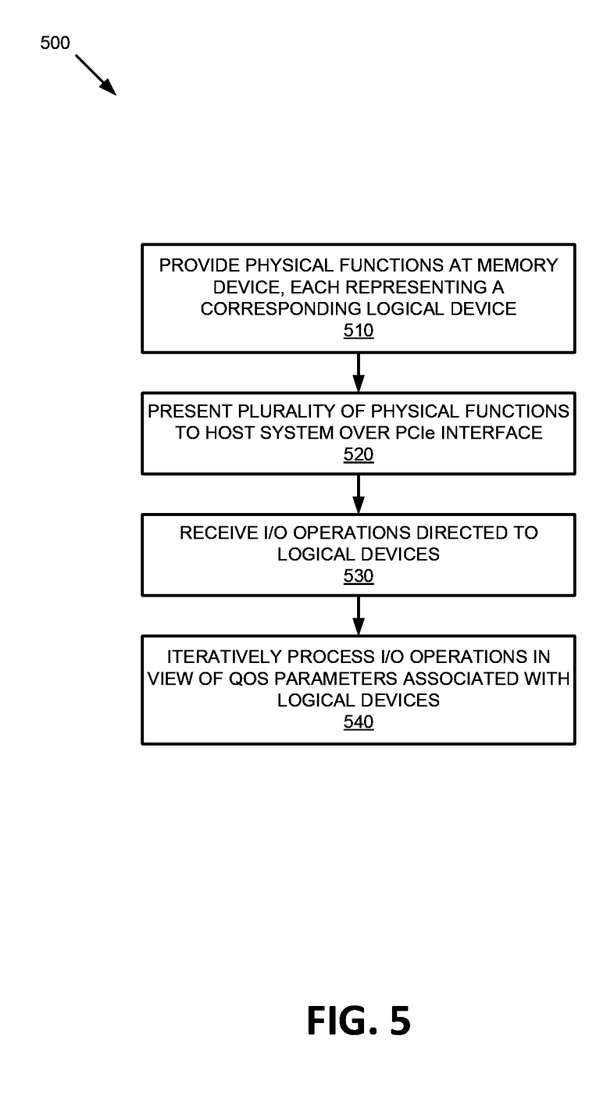
FIG. 5 illustrates a method of quality of service control of logical devices for memory sub-systems in accordance with some embodiments of the present disclosure.

FIG. 5 illustrates a method of quality of service control of logical devices for memory sub-systems in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by QoS management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, the processing logic provides a number of physical functions 412-418, wherein each of the physical functions 212-218 corresponds to a virtual memory controllers, such as NVMe Controller 211 or one of virtual NVMe controllers 402-408. Each of the physical functions 412-418 represents a corresponding logical device, such as one of logical devices 230-A-230-C, as a physical device to the host system 120 on a communication interface, such as PCIe bus 210. In one embodiment, the physical functions 412-418 are created in response to input received from the system administrator via a management interface.

At operation 520, the processing logic presents the physical functions 412-418 to a host computing system, such as host system 120, over the communication interface, such as PCIe bus 210. In one embodiment, the host system 120 assigns each of the physical functions 412-418 to a different virtual machine, such as one of virtual machines 432, 434, 436, running on the host system 120. Each of the physical functions 412-418 provides a configuration space for a corresponding one of the logical devices, wherein each configuration space is individually addressable. In other embodiments, each of the physical functions 412-418 can be assigned to separate application, users, programs, etc. running on host system 120, or even to separate host systems entirely.

At operation 530, the processing logic receives requests to perform I/O operations from host system 120. In one embodiments, the requests are received from an assigned virtual machine, such as one of virtual machines 432, 434, 436, running on the host system 120. The requests can pertain to the one or more memory devices, such as memory devices 130.

At operation 540, the processing logic iteratively processes the I/O operations corresponding to the logical devices 230-A-230-C associated with the memory device 130. In one embodiment, one or more of virtual NVMe controllers 402-408 can perform the requested I/O operation, such as a read, write or erase operation, and can return requested data and/or a confirmation or error message to the host system 120, as appropriate. In one embodiment, arbiter component 220 of QoS management component 220 manages the memory access requests, as well as background operations performed on the memory device, in view of QoS parameters associated with the physical functions. In one embodiment, QoS credit manager 225 manages operation credits for the physical functions, wherein a number of credits associated with each physical function is based at least in part of the QoS parameters, as described in more detail with respect to FIG. 6. For example, QoS management component 220 progressively rotate through each of the logical devices to determine whether I/O operations directed to a current logical device are present (e.g., in a corresponding FIFO) and whether sufficient operation credits are available to process those I/O operations.

Figure 6:
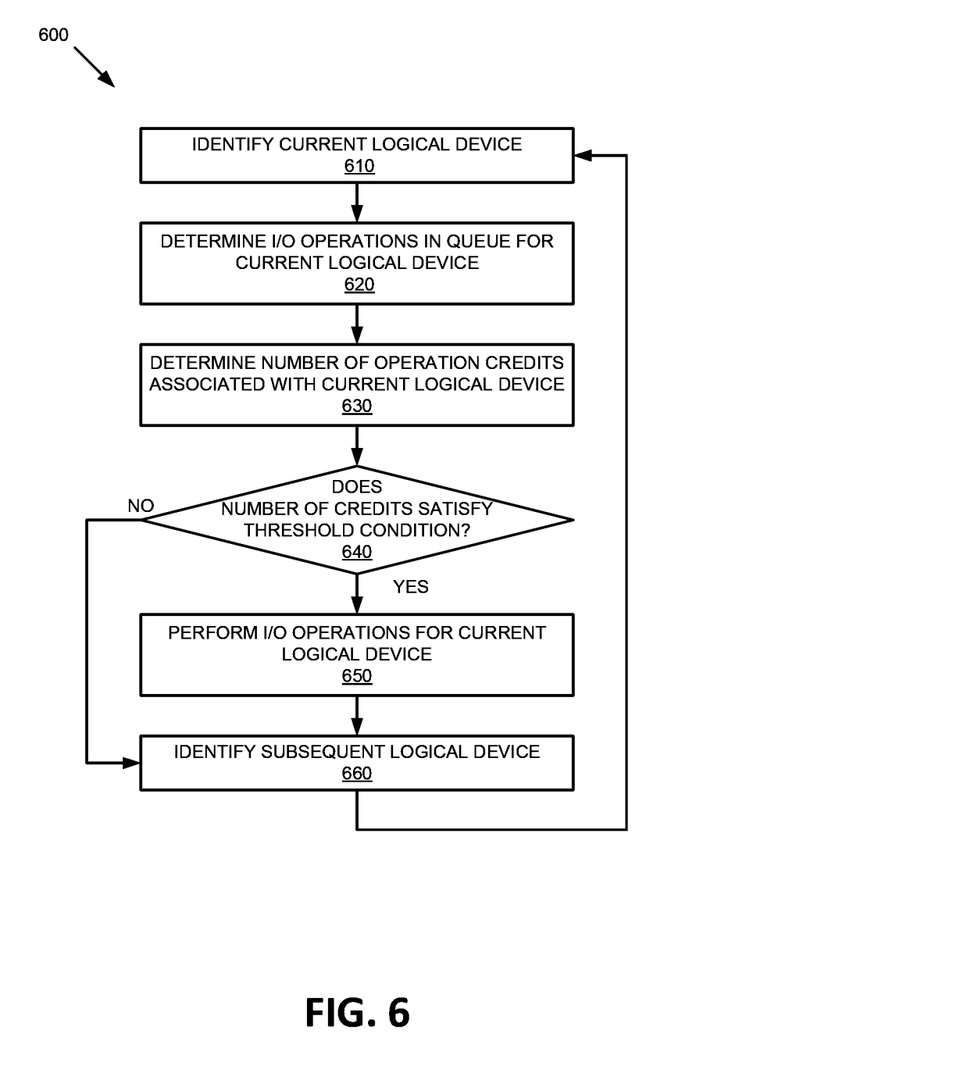
FIG. 6 illustrates a method of processing I/O operations for logical devices of a memory device in view of quality of service parameters in accordance with some embodiments of the present disclosure.

FIG. 6 illustrates a method of processing I/O operations for logical devices of a memory device in view of quality of service parameters in accordance with some embodiments of the present disclosure. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by QoS management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 610, the processing logic identifies a current logical device. In one embodiment, identifying the current logical device includes applying at least one of a burst arbitration scheme or a timer arbitration scheme to the logical devices. The current logical device represents one of logical devices 230-A-230-C which is being operated on by QoS management component 113. As part of an iterative process, QoS management component 113 operates on each of the logical devices in turn, returning to a first logical device after operating on a last logical device, and the operations described with respect to method 600 can be performed for each of the logical device.

At operation 620, the processing logic determines one or more I/O operations in queue for the current logical device. In one embodiment, QoS management component 113 examines a corresponding queue for the current logical device, such as a corresponding FIFO 212-A-212-C. The corresponding queue maintains requests to perform I/O operations at the current logical device. In one embodiment, the requests are received from host system 120 via PCIe bus 205 and are directed to an associated physical function of the memory sub-system controller 115.

At operation 630, the processing logic determines a number of operation credits associated with the current logical device. In one embodiment, the number of credits is based at least in part on a set of quality of service (QoS) parameters for the current logical device. In one embodiment, the set of QoS parameters for the current logical device indicates a subset of a bandwidth capability or an input/output operations per second (IOPS) capability of the memory device associated with the current logical device. In one embodiment, the set of QoS parameters for the current logical device includes at least one of a limit parameter associated with a maximum bandwidth and/or TOPS capability for the current logical device or a reservation parameter associated with a minimum bandwidth and/or TOPS capability for the current logical device.

At operation 640, the processing logic determines whether the number of operation credits satisfies a threshold condition. In one embodiment, the number of operation credits satisfies the threshold condition when the number of operation credits is a positive number of operation credits. For example, as long as the current logical device, has at least one operation credit, QoS management component 113 can determine that the threshold condition is satisfied. In other embodiments, some other threshold number of credits can be defined. In one embodiment, the number of operation credits associated with the current logical device periodically increases in response to the passage of one or more timer cycles of a timer associated with the current logical device, as described above in detail with respect to FIG. 3.

Responsive to determining that the number of operation credits satisfies the threshold condition, at operation 650, the processing logic performs the one or more I/O operations for the current logical device. In one embodiment, each of the one or more I/O operations can include one or more sub-operations. Each sub-operation corresponding to a memory access operation, such as a read operation a write/program operation, or an erase operation. In one embodiment, one operation credit is used to perform each of the sub-operations, and the operation credit count is decremented accordingly.

At operation 660, the processing logic identifies a subsequent logical device of the multiple logical devices. Once the I/O operations are performed, or if it is determined that insufficient operation credits are available at operation 640, QoS management component 113 can identify a subsequent logical device on which to operate accordingly to the relevant arbitration scheme being implemented on memory device 130.

Figure 7:
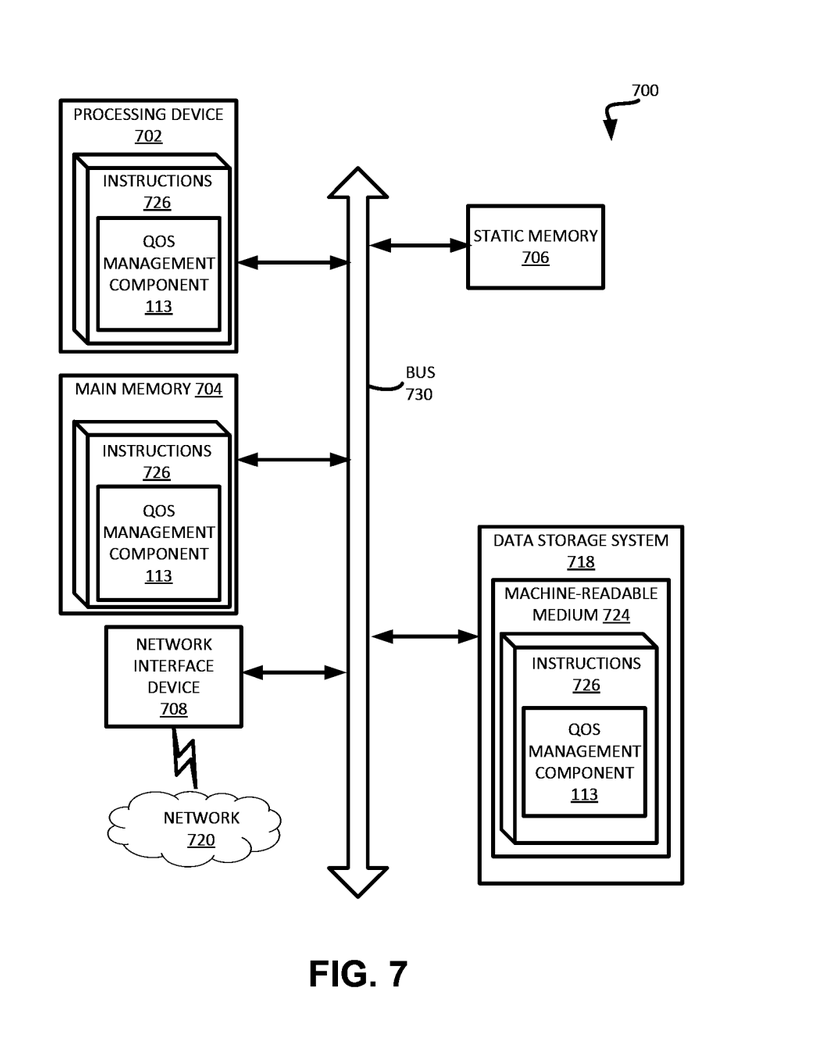
FIG. 7 is a block diagram of an example computer system in which implementations of the present disclosure can operate.

FIG. 7 illustrates an example machine of a computer system 700 within which a set of instructions, for causing the machine to perform any one or more of the methodologies discussed herein, can be executed. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to QoS management component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, digital or non-digital circuitry, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 708 to communicate over the network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIG. 1.

In one embodiment, the instructions 726 include instructions to implement functionality corresponding to a parallel iterator component (e.g., the QoS management component 113 of FIG. 1). While the machine-readable storage medium 724 is shown in an example embodiment to be a single medium, the term "machine-readable storage medium"

should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   iteratively processing input/output (I/O) operations corresponding to a plurality of logical devices associated with a memory device of a memory subsystem, wherein, for each of the plurality of logical devices, the processing comprises:
   identifying, by a processing device, a current logical device of the plurality of logical devices for which to perform one or more I/O operations during a current iteration;
   determining the one or more I/O operations in queue for the current logical device;
   determining a number of operation credits associated with the current logical device, wherein the number of credits is based at least in part on a set of quality of service (QoS) parameters for the current logical device;
   responsive to determining that the number of operation credits satisfies a threshold condition, performing, by the processing device, the one or more I/O operations for the current logical device; and
   identifying a subsequent logical device of the plurality of logical devices for which to perform one or more I/O operations during a subsequent iteration.

2. The method of claim 1, wherein identifying the current logical device comprises applying at least one of a burst arbitration scheme or a timer arbitration scheme to the plurality of logical devices.

3. The method of claim 1, wherein the set of QoS parameters for the current logical device indicates a subset of at least one of a bandwidth capability or an input/output operations per second (IOPS) capability of the memory device associated with the current logical device.

4. The method of claim 3, wherein the set of QoS parameters for the current logical device comprises at least one of a limit parameter associated with at least one of a maximum bandwidth capability or a maximum TOPS capability for the current logical device or a reservation parameter associated with at least one of a minimum bandwidth capability or a minimum TOPS capability for the current logical device.

5. The method of claim 1, wherein the number of operation credits satisfies the threshold condition when the number of operation credits is a positive number of operation credits.

6. The method of claim 1, wherein the number of operation credits associated with the current logical device periodically increases in response to the passage of one or more timer cycles of a timer associated with the current logical device.

7. The method of claim 1, further comprising:
presenting a plurality of physical functions to a host computing system over a communication interface, wherein each of the plurality of physical functions represents a corresponding one of the plurality of logical devices as a physical device to the host computing system.

8. A system comprising:
a memory device; and
a processing device, operatively coupled with the memory device, the processing device to perform operations comprising:
 iteratively processing input/output (I/O) operations corresponding to a plurality of logical devices associated with the memory device, wherein, for each of the plurality of logical devices, the processing comprises:
  identifying, by a processing device, a current logical device of the plurality of logical devices for which to perform one or more I/O operations during a current iteration;
  determining the one or more I/O operations in queue for the current logical device;
  determining a number of operation credits associated with the current logical device, wherein the number of credits is based at least in part on a set of quality of service (QoS) parameters for the current logical device;
  responsive to determining that the number of operation credits satisfies a threshold condition, performing, by the processing device, the one or more I/O operations for the current logical device; and
  identifying a subsequent logical device of the plurality of logical devices for which to perform one or more I/O operations during a subsequent iteration.

9. The system of claim 8, wherein identifying the current logical device comprises applying at least one of a bust arbitration scheme or a timer arbitration scheme to the plurality of logical devices.

10. The system of claim 8, wherein the set of QoS parameters for the current logical device indicates a subset of at least one of a bandwidth capability or an input/output operations per second (IOPS) capability of the memory device associated with the current logical device.

11. The system of claim 10, wherein the set of QoS parameters for the current logical device comprises at least one of a limit parameter associated with at least one of a maximum bandwidth capability or a maximum TOPS capability for the current logical device or a reservation parameter associated with at least one of a minimum bandwidth capability or a minimum TOPS capability for the current logical device.

12. The system of claim 8, wherein the number of operation credits satisfies the threshold condition when the number of operation credits is a positive number of operation credits.

13. The system of claim 8, wherein the number of operation credits associated with the current logical device periodically increases in response to the passage of one or more timer cycles of a timer associated with the current logical device.

14. The system of claim 8, wherein the operations further comprise:
presenting a plurality of physical functions to a host computing system over a communication interface, wherein each of the plurality of physical functions represents a corresponding one of the plurality of logical devices as a physical device to the host computing system.

15. A non-transitory computer-readable storage medium comprising instructions that, when executed by a processing device, cause the processing device to perform operations comprising:
providing a plurality of physical functions at a memory device;
presenting the plurality of physical functions to a host computing system over a peripheral component interconnect express (PCIe) interface, wherein each of the plurality of physical functions corresponds to a different virtual machine running on the host computing system; and
managing input/output (TO) operations received from the host computing system and directed to the plurality of physical functions in view of a number of operation credits associated with each physical function, wherein the number of credits is based at least in part on a set of quality of service (QoS) parameters for a corresponding physical function.

16. The non-transitory computer-readable storage medium of claim 15, wherein each of the plurality of physical functions represents a corresponding logical device of a plurality of logical devices of the memory device.

17. The non-transitory computer-readable storage medium of claim 16, wherein managing the I/O operations comprises:
determining a number of operation credits associated with a current logical device of the plurality of logical devices, wherein the number of credits is based at least in part on a set of quality of service (QoS) parameters for the current logical device; and
determining whether the number of operation credits satisfies a threshold condition.

18. The non-transitory computer-readable storage medium of claim 17, wherein the set of QoS parameters for the current logical device indicates a subset of at least one of a bandwidth capability or an input/output operations per second (TOPS) capability of the memory device associated with the current logical device.

19. The non-transitory computer-readable storage medium of claim 17, wherein the set of QoS parameters for the current logical device comprises at least one of a limit parameter associated with at least one of a maximum bandwidth capability or a maximum TOPS capability for the current logical device or a reservation parameter associated with at least one of a minimum bandwidth capability or a minimum TOPS capability for the current logical device.

20. The non-transitory computer-readable storage medium of claim 17, wherein the number of operation credits satisfies the threshold condition when the number of operation credits comprises one or more operation credits.

* * * * *